United States Patent [19]

Callaghan

[11] 4,111,062

[45] Sep. 5, 1978

[54] CONTROL MECHANISM FOR HYDROSTATIC TRANSMISSIONS

[75] Inventor: William I. Callaghan, Mentor, Ohio

[73] Assignee: Towmotor Corporation, Mentor, Ohio

[21] Appl. No.: 809,725

[22] Filed: Jun. 24, 1977

[51] Int. Cl.² .......................... F16H 21/44; G05G 7/04

[52] U.S. Cl. .......................................... 74/96; 74/470; 74/516

[58] Field of Search .................. 74/10.9, 96, 470, 491, 74/516, 518

[56] References Cited

U.S. PATENT DOCUMENTS

| | | | |
|---|---|---|---|
| 2,231,609 | 2/1941 | Andersen | 74/10.9 X |
| 2,777,329 | 1/1957 | Banker | 74/96 |
| 3,055,226 | 9/1962 | Kiessling | 74/470 X |
| 3,491,605 | 1/1970 | Macdonald | 74/96 |

*Primary Examiner*—Allan D. Herrmann
*Attorney, Agent, or Firm*—Phillips, Moore, Weissenberger, Lempio & Majestic

[57] ABSTRACT

A rocker shaft is rotatably mounted and integral with a control valve of a hydrostatic transmission. The valve shaft may be rotated in an arc to either side of a neutral position. A housing is mounted to the control valve with rocker shaft projecting into the housing. A pair of levers are pivotally mounted on the rocker shaft in scissored relationship thereon and an actuating arm is rotatably mounted on the housing to engage camming surfaces defined on first ends of the levers. A drive member or dog is secured to the rocker shaft to engage between second ends of the levers whereby pivotal movments of the actuating arm will transmit pivotal movements of the levers to the rocker shaft to control mechanisms of the control valve. The second ends of the levers are biased towards each other into engagement with the drive member by a coil spring and a stop lug is secured on each of the levers to engage and pivot the other one of the levers in response to pivotal movements of the actuating arm. The stop lug is incorporated as a device to assure positive response of the valve shaft at a high speed reversal of an input shaft secured to the actuating arm.

9 Claims, 3 Drawing Figures

CONTROL MECHANISM FOR HYDROSTATIC TRANSMISSIONS

BACKGROUND OF THE INVENTION

Rotary control shafts are oftentimes utilized in the control mechanisms for hydrostatic transmissions to selectively actuate the same. Various linkage systems have been proposed for use in such control mechanisms to effect such selective actuation of the control shaft. Conventional linkage systems are oftentimes unduly complex and place high stress concentrations on component parts thereof. In addition, relatively high initial starting torques are required to displace the control mechanisms from their neutral conditions of operation.

Also, conventional control mechanisims of this type are normally exposed to ambient conditions to thus give rise to potential lubrication and malfunctioning problems when they are exposed to dirt laden environments and the like. Furthermore, such control mechanisms do not provide means for assuring positive response to the control shafts upon high speed reversals of the rotary input shafts thereof.

SUMMARY OF THIS INVENTION

The present invention is directed to overcoming one or more of the problems as set forth above.

The control mechanism of this invention comprises rotatable input and output means and a pair of levers pivotally mounted on the output means. First ends of the levers define cam surfaces thereon normally engaged with the input means which is adapted to alternately pivot the levers on the output means. Second ends of the levers are spring-biased towards each other and drive means, connected to the output means, engage the levers to selectively rotate the output means, upon selective rotation of the input means. A stop means, formed on each of the levers, is adapted to engage and pivot the other one of the levers in response to rotation of the input means.

BRIEF DESCRIPTION OF THE DRAWINGS

Other objects of this invention will become apparent from the following description and accompanying drawings wherein.

DETAILED DESCRIPTION

Figure 1:
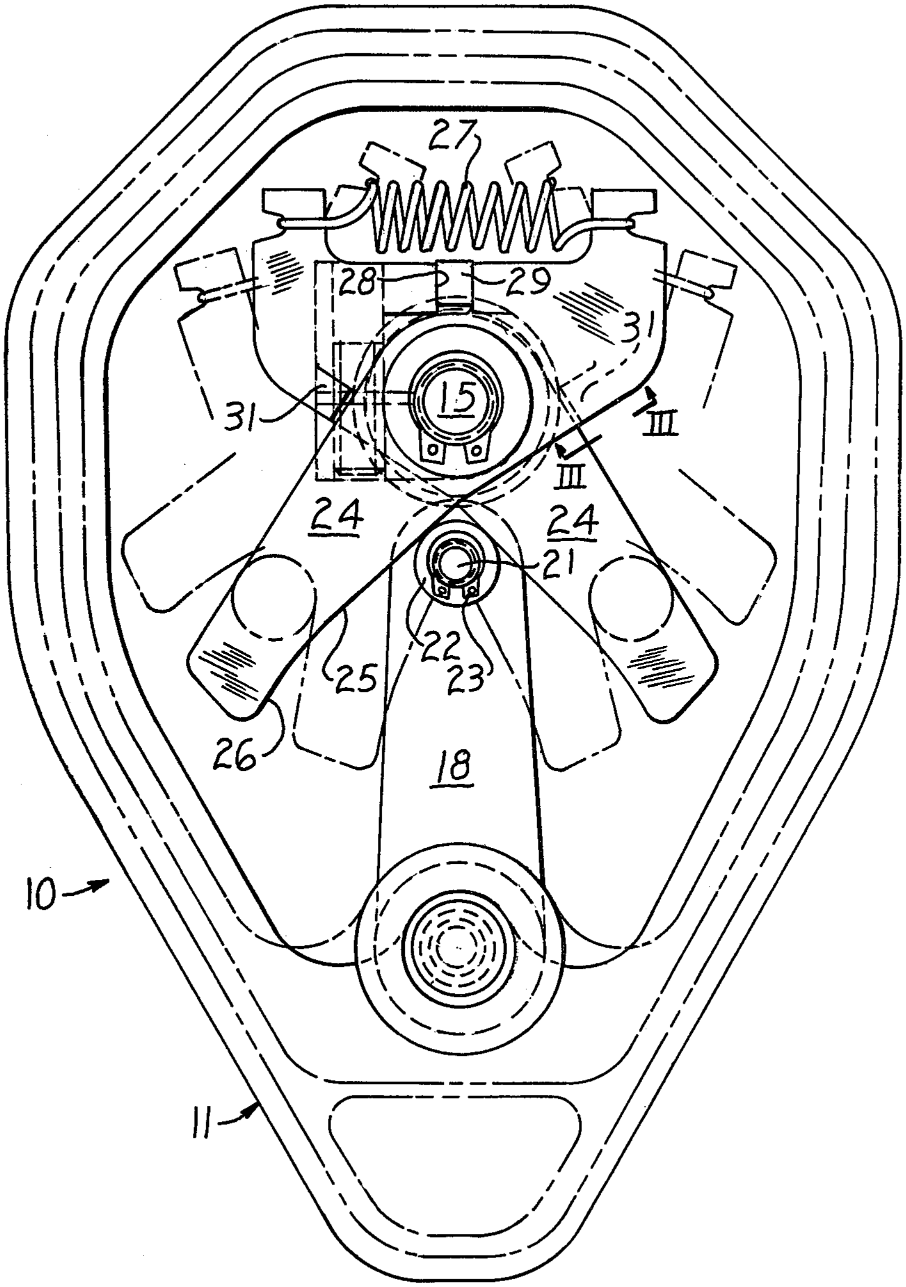
FIG. 1 is a front elevational view of the control mechanism of this invention for selectively actuating a rock shaft, adapted to be operatively connected to a control valve of a hydrostatic transmission.
Figure 2:
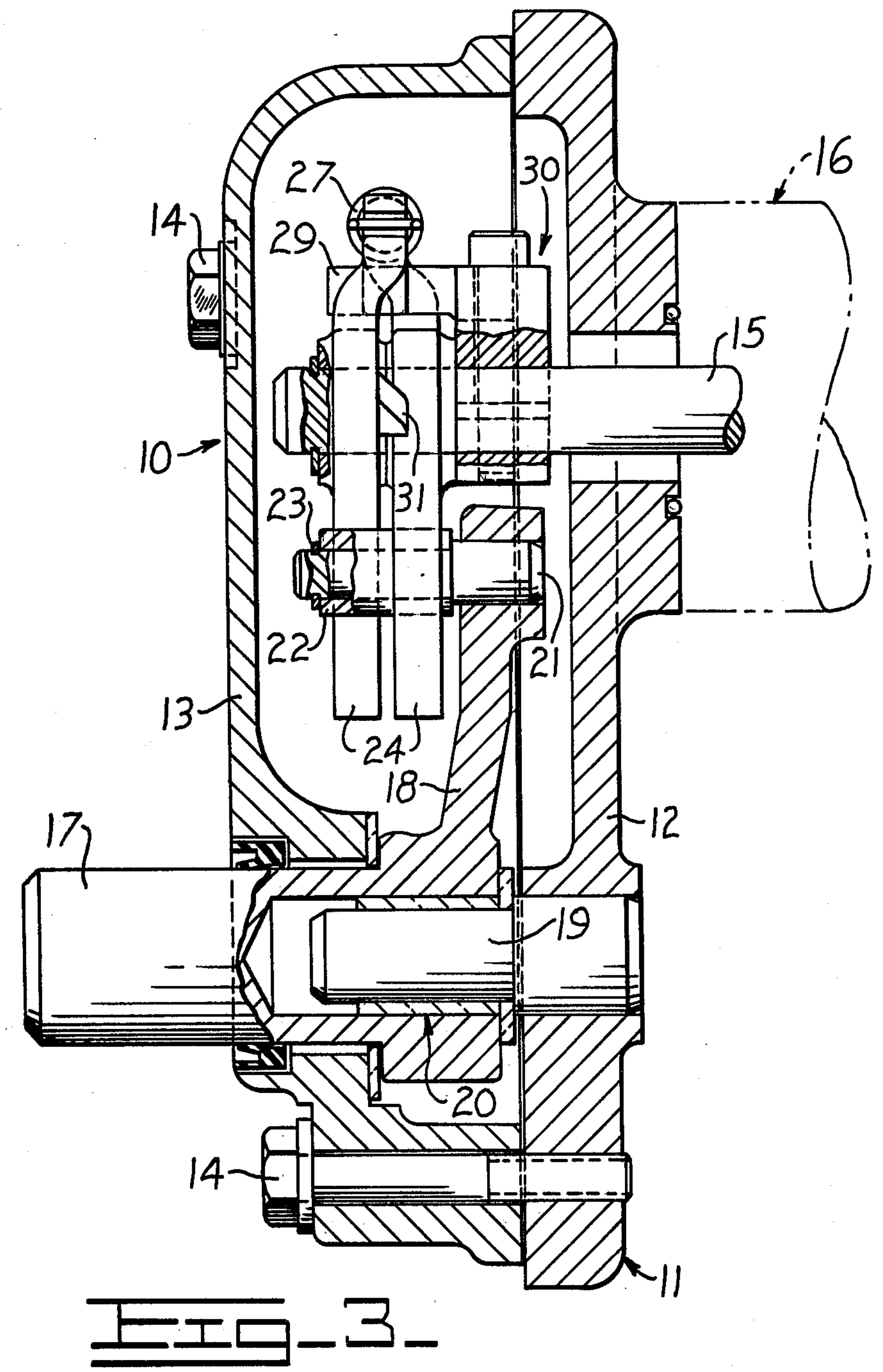
FIG. 2 is a sectional view through the control mechanism, taken in the direction of arrows II—II in FIG. 1.

FIGS. 1 and 2 illustrate a control mechanism 10 mounted in a housing 11 comprising a stationary support or mounting plate 12 and a cover plate 13 attached thereon by a plurality of bolts 14. The housing is suitably sealed to prevent the ingress of contaminants therein and to prevent the egress of lubricating oil out of the housing. A rocker shaft or output means 15 extends into the housing and is preferably formed as an integral part of a control valve (not shown) of a hydrostatic transmission, generally shown at 16. It should be understood that the rocker shaft of the control mechanism could be utilized for controlling actuation of devices other than the control valve of a hydrostatic transmission.

Rocking movements are selectively imparted to rocker or output shaft 15 by an input shaft 17 which is adapted for connection to a pedal-actuated linkage (not shown), the foot pedal of which is suitably mounted in the operator's cab of a vehicle. Such linkage may be of the type disclosed in U.S. patent application Ser. No. 809,726, filed on June 24, 1977, by Richard N. Fatur for "Transmission and Throttle Control Arrangement".

The input means of control mechanism 10 further comprises an actuating arm 18 secured to input shaft 17 therefor and rotatably mounted on a stub shaft 19, secured to housing 11, by a cylindrical bearing bushing 20. A pin 21 is secured to the opposite end of the actuating arm and has a cylindrical roller 22 rotatably mounted thereon and retained in place by a snap ring 23. A pair of substantially identical lever means or levers 24 are pivotally mounted for relative movements on output shaft 15 and are disposed in scissored relationship relative to each other, as clearly shown in FIG. 1.

A camming surface 25 is formed on each lever and roller 22 is normally engaged between the camming surfaces of the levers to rotate output shaft 15 in either direction in response to rotation of actuating arm 18, as will be hereinafter more fully described. As will be further described, a "neutral" surface means 26 is also formed on each lever as an extension of a respective camming surface and is adapted to slidably engage roller 22 when arm 18 swings to an extreme position, past camming surface 25.

Second ends of the levers have a extension coil spring 27 connected therebetween to normally urge these ends of the levers towards each other. The second ends of the levers define a notch 28 therebetween to accommodate a drive means or dog 29 therebetween. The dog is formed integrally on a collar assembly 30 connected to output shaft 15 for simultaneous rotation therewith.

Figure 3:
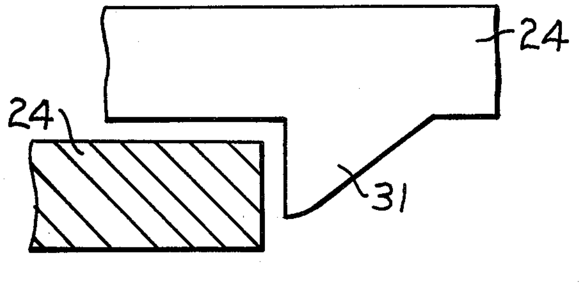
FIG. 3 is a sectional view, taken in the direction of arrows III—III in FIG. 1.

As shown in FIGS. 1 and 3, a stop means, preferably in the form of a lug 31, is secured on each lever to engage and pivot the other lever upon rotation of arm 18 to a predetermined position. The stop means will also permit the control mechanism to function should spring 27 become broken, for example. Also, as hereinafter explained, the stop means will prevent sudden overextension of the spring during normal operation of the control mechanism in the event of a high speed reversal thereof.

FIG. 1 illustrates the control mecahnism in a neutral condition of operation. When input shaft 17 and thus actuating arm 18 are rotated either clockwise or counterclockwise, roller 22 will engage a first lever 24 to, in turn, rotate output shaft 15. In particular, the pivoted first lever will tend to expand spring 27 to pivot the second lever in the same direction and against dog 29 of collar assembly 30 which is secured to shaft 15.

In one typical example, output shaft 15 may be rotated through an angle of from 18° to 22° in either direction, as determined by internal transmission tolerances, to effect full swash-plate displacement of the hydrostatic transmission. Actuating arm 18 may be rotated through an angle of 40° in either direction from its illustrated neutral position, about the rotational axis of input shaft 17. The first 23° of travel of the actuating arm will, in turn, effect the full 22° of rotation of output shaft 15. The remaining 17° of actuating arm rotation comprises an override mode of transmission operation wherein roller 22 will ride on neutral surface 26 of the lever, as depicted by phantom lines.

It can be seen that if output shaft 15 can stop at 18° of rotation, and that the first 23° of rotation of actuating arm 18 will attempt to cause 22° rotation of the output shaft, that a "mechanical fuse" must exist between the actuating arm and the output shaft. Such fuse is accomplished by the ability of lever arm 24 to pivot freely on the output shaft when the resistance force, produced by spring 27 against dog 29, is exceeded.

As mentioned above, stop means 31 will function to prevent sudden over-extension of spring 27 in the event of a high speed reversal of the control mechanism. In particular, should the transmission be changed rapidly from its forward to its reverse mode of operation, actuating arm 18 could rotate at a rate faster than the follow-up rotational speed of output shaft 15. For example, assume that the stop means forming a first lever will not be engaged by the second lever until the second lever has rotated 5° from its neutral position, illustrated in FIG. 1. The initial of 5° of "lost-motion" rotation of the second lever is against the counteracting biasing force of spring 27 whereas further rotation of the second lever will limit the extension of the spring and mechanism will thereafter act as a solid lever throughout the reversal mode.

The embodiments of the invention in which an exclusive property or privilege is claimed are defined as follows:

1. A control mechanism comprising:

rotatable output means, rotatable input means, a pair of lever means pivotally mounted for relative movement on said output means and disposed in scissored relationship relative to each other, a camming surface defined on a first end of each of said lever means normally engaged with said input means for rotating on said output means in response to rotation of said input means, biasing means connected between second ends of said lever means for normally urging them towards each other, drive means connected to said output means and engageable between the second ends of said lever means, and stop means secured on each of said lever means for engaging and pivoting the other one of said lever means in response to pivoting of said input means.

2. The control mechanism of claim 1 further comprising a housing including a mounting plate adapted for attachment to a housing of a hydrostatic transmission and a cover plate detachably mounted on said mounting plate, and wherein said input means, lever means, spring means and drive means each disposed in said housing.

3. The control mechanism of claim 1 wherein said input means comprises a rotatable input shaft and an actuating arm secured on said input shaft and normally engaged between the first ends of said lever means when said control mechanism is in its neutral condition of operation.

4. The control mechanism of claim 1 further comprising a neutral surface means defined on each of said lever means as an extension of said camming surface for permitting said input means to move relative to said lever means without pivoting said lever means on said shaft means.

5. The control mechanism of claim 3 wherein said actuating arm has a roller rotatably mounted thereon and normally engaged between said lever means.

6. The control mechanism of claim 1 wherein said biasing means constitutes an extension coil spring.

7. The control mechanism of claim 1 wherein said lever means define a notch therebetween and wherein said drive means comprises a dog normally disposed within said notch.

8. The control mechanism of claim 7 wherein said drive means further comprises a collar assembly secured on said output means having said dog secured thereto.

9. The control mechanism of claim 1 wherein said stop means constitutes a lug secured integrally on each of said lever means.

* * * * *